April 6, 1926.   1,579,534
L. R. HIBBARD ET AL
TREE PROTECTOR
Original Filed Feb. 12, 1923
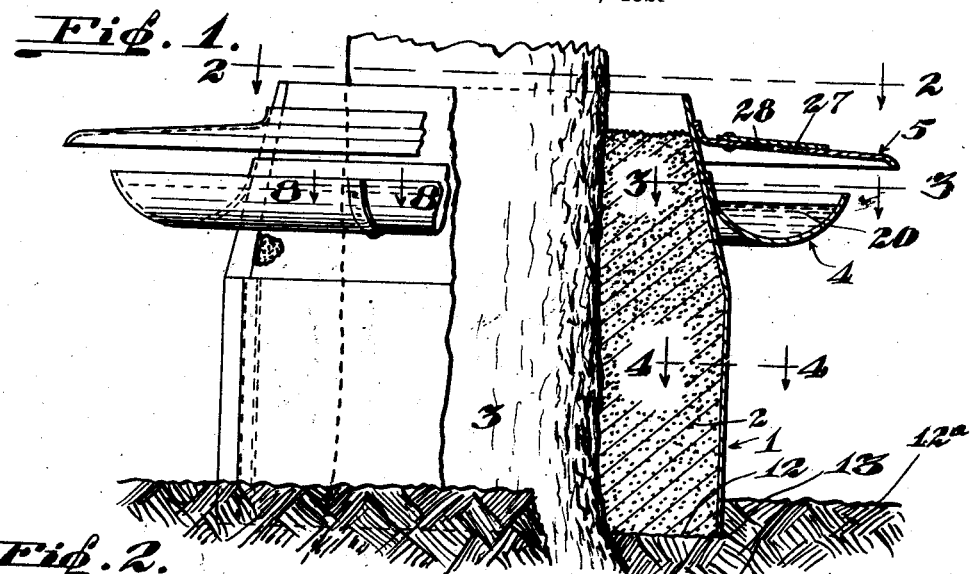
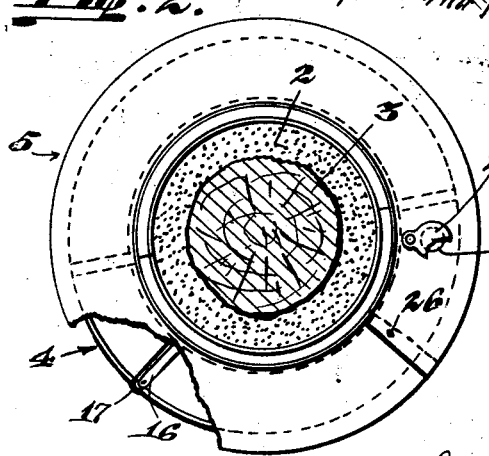
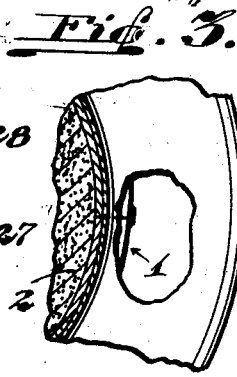
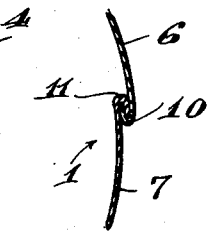
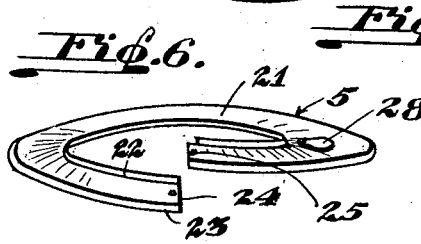
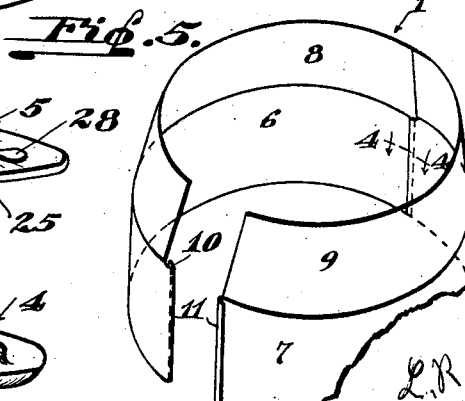
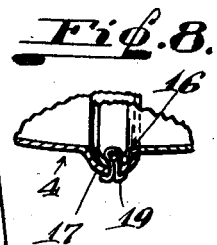
Inventors:
L. R. Hibbard Patented Apr. 6, 1926.

1,579,534

UNITED STATES PATENT OFFICE.

LOUIS R. HIBBARD AND RENI S. BERRY, OF LOS ANGELES, CALIFORNIA.

TREE PROTECTOR.

Application filed February 12, 1923, Serial No. 618,596. Renewed September 15, 1925.

*To all whom it may concern:*

Be it known that we, LOUIS R. HIBBARD and RENI S. BERRY, citizens of the United States, residing at Los Angeles, in the county of Los Angeles and State of California, have invented new and useful Improvements in Tree Protectors, of which the following is a specification.

This invention relates to tree protectors of the type especially adapted to serve as a barrier to prevent crawling insects from gaining access to the tree from the ground.

An object of the invention is to provide a guard of the above character which may readily positioned around the trunk of a tree to afford a continuous liquid containing trough around the tree trunk. Another object is to provide a tree protector consisting of few parts which may be cheaply manufactured and readily assembled.

With the foregoing objects in view together with such other objects and advantages as may subsequently appear the invention consists of the parts and the construction, arrangement and combination of parts hereinafter described and claimed, and illustrated in the accompanying drawings in which:

Figure 1 is a fragmentary sectional and side elevation showing the trunk of a tree provided with a protector in accordance with the principles of our invention.

Fig. 2 is a view in horizontal section as seen on the line 2—2 of Fig. 1 and looking downwardly.

Fig. 3 is a fragmentary sectional detail on the line 3—3 of Fig. 1 and looking downwardly.

Fig. 4 is a fragmentary sectional detail on the line 4—4 of Figs. 1 and 5 and looking downwardly.

Fig. 5 is a perspective of the supporting casing, shown in Fig. 1, parts being broken away.

Fig. 6 is a perspective of the cover shown in Figs. 1 and 2.

Fig. 7 is a perspective of the trough shown in Figs. 1 and 2.

Fig. 8 is fragmentary sectional detail of the joint in the trough and taken on the line 8—8 of Fig. 1 and looking downwardly.

Referring to the drawings in detail, the construction is substantially as follows:

The supporting casing 1 holds a bank 2 of sand or dirt around the trunk 3 of the tree. The trough 4 is mounted upon the casing 1 and extends around the tree. The cover 5 is mounted upon the casing 1 and extends over the trough 4 to keep rain, leaves and dirt out of the oil.

The details of the supporting casing 1 are as follows: The casing is built of sheet metal and consists of the lower straight cylindrical portions 6 and 7 and the upper tapered cylindrical portions 8 and 9. The portions 6 and 7 each form a half circle in plan and together form a circle. Interlocking hook flanges 10 and 11 are formed on the meeting edges to secure the portions 6 and 7 together. The tapered portions 8 and 9 fit the upper edges of the portions 6 and 7 and are inclined or flared inwardly to make the casing smallest, in diameter or circumference, at the top. The end edges of the portions 8 and 9 abut squarely together. When assembled the tapered portions 8 and 9 form seats for the trough 4 and the cover 5.

The two halves of the casing 1 will nest, one in the other, for handling and transporting, and may be readily placed around the tree trunk and then hooked together. Before placing the casing in position the insect infected earth around the tree trunk should be cleared away thus producing a trench 12 around the tree trunk. Then the casing 1 is set in the trench thus bringing the lower edge 13 below the normal surface 14 of the earth. The casing is substantially evenly spaced from the tree trunk all the way around. Then the bank 2 of clean dry sand, earth or like soft material is shovelled into the casing to fill the space, more or less between the tree trunk and the casing to the desired height. Grubs and other insects which travel in or upon the surface of the earth will not go under the buried edge 13 of the casing and through the bank 2 to the tree trunk. The bank also serves as a soft cushion to hold the casing 1 in place. The bank 2 should contain no fertility and then will not invite roots or sprouts from the tree trunk and, in any event the bank will not interfere with the growth and expansion of the tree trunk.

The details of the trough 4 are as follows: The trough is built of sheet metal and is curved upwardly both ways from the center in cross-section.

The trough is split crosswise like a split ring, thus producing the ends 14 and 15 and the ends have transversely extending beads 16 and 17 which fit one within the other.

The trough is circular in plan and the inner wall 18 fits upon the tapered seat of the casing 1. The ends 14 and 15 are sprung apart to allow the tree trunk to pass and then the ends are brought together, the beads 16 and 17 assembled and cotter pins 19 inserted through the beads to hold the ends together. The tapered seat upon the casing 1, the inner wall 18, the ends 14 and 15 and the beads 16 and 17 may be treated with asphalt or the like to close the joints to hold oil and to prevent insects from passing between the trough and the casing. The trough may be driven down tight upon the tapered seat until it fits and forms a close joint. Any suitable oil, crude or otherwise, may be placed in the trough 4 to form the oil barrier 20 completely surrounding the tree trunk.

The details of the cover 5 are as follows: The cover is a split-ring of sheet metal and comprises the body portion 21 having the upturned inner edge 22 and the down turned outer edge 23, the body sloping slightly downwardly from the inner edge to the outer edge, and the ends 24 and 25 formed by the split being adapted to be sprung apart to allow the tree trunk to pass and adapted to overlap and be connected together by a cotter pin 26 when the cover is in place. An opening 27 is formed through the cover for viewing the oil 20 and for adding more oil. A swinging lid 28 covers the opening. The upturned inner edge 22 is driven down tightly upon the tapered seat of the casing 1 and may be coated with asphalt or the like to make a water tight joint. The cover extends outwardly beyond the trough 4 so as to keep rain, leaves and dirt out of the oil 20. The cover 5 is spaced from the trough 4, so that creeping insects cannot get to the cover.

All the sheet metal work may be galvanized iron, brass or the like rustless material or it may be black iron painted or coated to prevent rust.

The tree protector may readily be taken down, cleaned and rebuilt as often as required to suit the growth of the tree and to keep the parts clean and efficient.

Creeping insects will approach the tree in and upon the surface of the earth and will climb the casing 1 and crawl outwardly along the bottom of the trough 4 and over its outer edge to the oil barrier 20 and if they attempt to cross this barrier they will be drowned or stuck in the oil.

Thus we have produced a simple tree protector which will effectually keep all creeping and boring insects from the tree.

Various changes may be made without departing from the spirit of our invention as claimed.

We claim:

1. A tree protector comprising a supporting casing adapted to surround a tree trunk and spaced therefrom and having a tapered upper portion forming a seat, a trough fitting the seat, oil in the oil trough and forming an insect barrier surrounding the tree trunk, and a cover for the oil trough.

2. A tree protector comprising a trunk encircling casing having a tapered upper end portion, a split trough seating on the tapered end portion below the upper edge thereof, means for joining the split portions of the trough, a split cover seating on the tapered portion of the casing in superposed spaced relation to the trough and means connecting the split portions of the cover.

3. In a tree protector, a casing adapted to encircle a tree, said casing being formed with an elongated tapered upper end portion, and an annular trough through which the upper end portion of said casing extends; said trough seating on the inclined face of said upper end portion in wedge engagement with said casing.

4. In a tree protector, a casing adapted to encircle a tree, said casing being formed with an elongated tapered upper end portion, an annular trough seating on the inclined face of said upper end portion in spaced relation to the upper edge of the casing, and an annular cover member adapted to also seat on the inclined face of the upper end portion of the casing and be supported in spaced relation to the trough.

5. In a tree protector, a tree encircling casing divided vertically and having means for interconnecting the divided portions and formed with an inwardly inclined upper end portion, and an annular trough member encircling and seating upon the inclined surface of the upper end portion of said casing and serving to hold the casing against spreading.

LOUIS R. HIBBARD.
RENI S. BERRY.